US012749747B2

(12) United States Patent
Kwon

(10) Patent No.: US 12,749,747 B2
(45) Date of Patent: Sep. 29, 2026

(54) SECONDARY BATTERY

(71) Applicant: SK On Co., Ltd., Seoul (KR)

(72) Inventor: Myeong Seon Kwon, Daejeon (KR)

(73) Assignee: SK ON CO., LTD., Seoul (KR)

( * ) Notice: Subject to any disclaimer, the term of this patent is extended or adjusted under 35 U.S.C. 154(b) by 709 days.

(21) Appl. No.: 18/304,365

(22) Filed: Apr. 21, 2023

(65) Prior Publication Data

US 2023/0361399 A1 Nov. 9, 2023

(30) Foreign Application Priority Data

May 4, 2022 (KR) ........................ 10-2022-0055469

(51) Int. Cl.

| | |
|---|---|
| ***H01M 50/121*** | (2021.01) |
| ***H01M 50/105*** | (2021.01) |
| ***H01M 50/119*** | (2021.01) |
| ***H01M 50/124*** | (2021.01) |
| ***H01M 50/178*** | (2021.01) |

(Continued)

(52) U.S. Cl.

CPC ....... *H01M 50/193* (2021.01); *H01M 50/105* (2021.01); *H01M 50/178* (2021.01); *H01M 50/188* (2021.01)

(58) Field of Classification Search

CPC ............. H01M 50/193; H01M 50/105; H01M 50/178; H01M 50/188; H01M 50/121; H01M 50/124; H01M 50/186; H01M 50/119; H01M 50/375; H01M 50/195;

(Continued)

(56) References Cited

U.S. PATENT DOCUMENTS

2013/0095393 A1* 4/2013 Friesen ............... H01M 4/8605 429/535
2020/0212426 A1* 7/2020 Jang ...................... H01M 4/133

(Continued)

FOREIGN PATENT DOCUMENTS

EP 4184637 A1 5/2023
KR 10-0864694 B1 10/2008

(Continued)

OTHER PUBLICATIONS

Office Action for Korean Patent Application No. 10-2022-0055469 issued by the Korean Patent Office on Jun. 26, 2026.

*Primary Examiner* — Christian Roldan
(74) *Attorney, Agent, or Firm* — IP&T GROUP LLP

(57) ABSTRACT

A secondary battery includes an electrode assembly to which an electrode lead is bonded, a pouch case including a case body portion accommodating the electrode assembly in such a manner that a portion of the electrode lead protrudes externally, and a cover portion covering the case body portion, and a sealing portion in which the body portion and an outer circumferential portion of the cover portion of the pouch case contact each other and are sealed by thermal fusion. A polymer compound layer is attached on at least one of an upper surface and a lower surface of the electrode lead protruding externally. The polymer compound layer includes a thermally expandable polymer compound of composite of a hydroxy group-containing compound and silica, or at least one heat-shrinkable polymer compound selected from the group consisting of polyphenylene ether (PPE), polycarbonate (PC), polyoxymethylene (POM) and polyamide (PA).

9 Claims, 5 Drawing Sheets

I-I'

(51) Int. Cl.
*H01M 50/186* (2021.01)
*H01M 50/188* (2021.01)
*H01M 50/193* (2021.01)

(58) Field of Classification Search
CPC ............. H01M 50/197; H01M 50/557; H01M 2200/10; Y02E 60/10
USPC ........................................................... 429/179
See application file for complete search history.

(56) References Cited

U.S. PATENT DOCUMENTS

| | | | | |
|---|---|---|---|---|
| 2021/0002445 | A1* | 1/2021 | Prissok | C08L 75/04 |
| 2022/0223948 | A1* | 7/2022 | Yan | H01M 50/112 |
| 2023/0246273 | A1* | 8/2023 | Sasaki | H01M 10/0562 429/319 |

FOREIGN PATENT DOCUMENTS

| | | | |
|---|---|---|---|
| KR | 10-0978577 | B1 | 8/2010 |
| KR | 10-2014-0147412 | A | 12/2014 |
| KR | 10-2018-0095982 | A | 8/2018 |
| WO | 2022014718 | A1 | 1/2022 |

* cited by examiner

I-I'

SECONDARY BATTERY

CROSS-REFERENCE TO RELATED APPLICATION(S)

This patent document claims the priority and benefits of Korean Patent Application No. 10-2022-0055469 filed on May 4, 2022, the disclosure of which is incorporated herein by reference in its entirety.

TECHNICAL FIELD

The technology and implementations disclosed in this patent document generally relate to a secondary battery.

BACKGROUND

Lithium ion secondary batteries are batteries capable of repeating charging and discharging, and demand for the lithium ion secondary battery as an energy source is rapidly increasing as technology development and demand for mobile devices, electric vehicles and the like have recently increased.

Lithium ion secondary batteries have a problem in which the cell pressure increases due to vaporization of an electrolyte solution as the internal temperature increases. When a certain threshold is reached, the temperature of the cell increases rapidly, and a chemical exothermic reaction occurs between the electrolyte and the electrode, further increasing the cell pressure. As described above, when the cell temperature continues to increase, there is a concern that thermal runaway may occur, which may furthermore lead to a problem of thermal propagation of heat generated in one cell to an adjacent cell or to an adjacent module.

Therefore, there is a need for a secondary battery capable of stably maintaining performance of the battery by preventing the thermal runaway or thermal propagation problem and ensuring the safety of the battery.

SUMMARY

The disclosed technology may be implemented in some embodiments to provide a secondary battery in which, when there is a risk of gas generation inside of the secondary battery due to a thermal runaway situation in which the temperature inside of the secondary battery rapidly increases due to an abnormal reaction of the secondary battery, gas or electrolyte, which is one of causes of thermal runaway, may be removed by selectively inducing a gas vent before a rapid change in internal temperature occurs, thereby improving stability of a secondary battery.

In some embodiments of the disclosed technology, a secondary battery includes an electrode assembly to which an electrode lead is bonded; a pouch case including a case body portion accommodating the electrode assembly in such a manner that a portion of the electrode lead protrudes externally, and a cover portion covering the case body portion; and a sealing portion in which outer circumferential portions of the case body portion and the cover portion of the pouch case contact each other and are sealed by thermal fusion. A polymer compound layer is attached on at least one of an upper surface and a lower surface of the electrode lead protruding externally. The polymer compound layer includes a thermally expandable polymer compound of a composite of a hydroxy group-containing compound and silica; or at least one heat-shrinkable polymer compound selected from the group consisting of polyphenylene ether (PPE), polycarbonate (PC), polyoxymethylene (POM) and polyamide (PA).

The composite of the hydroxy group-containing polymer and the silica may be a polyurethane-silica hybrid.

The polymer compound layer may be formed on a portion or an entirety of a width of the sealing portion on the electrode lead.

The polymer compound layer may have one end located inside of the pouch case and the other end located inside or outside of the sealing portion of the electrode lead.

The polymer compound layer may have one end located inside of the sealing portion of the electrode lead and the other end located inside or outside of the sealing portion of the electrode lead.

The polymer compound layer may have a thickness of 3 to 25 μm.

The polymer compound layer may include a thermally expandable polymer compound and may have a volume at a temperature of 80° C. or higher, which is 30 to 4,000 times a volume at room temperature.

The polymer compound layer may include a heat-shrinkable polymer compound and may have a volume at 80° C. or higher, which is 0.02 to 0.9 times a volume at room temperature.

The polymer compound may be in the form of beads, pillars, flakes, or powder.

The polymer compound may include expanded graphite filled inside of the polymer compound.

The secondary battery may further include a sealant layer on at least one of the upper surface and the lower surface of the electrode lead.

BRIEF DESCRIPTION OF DRAWINGS

Certain aspects, features, and advantages of the disclosed technology are illustrated by the following detailed description with reference to the accompanying drawings.

DETAILED DESCRIPTION

Figure 1:
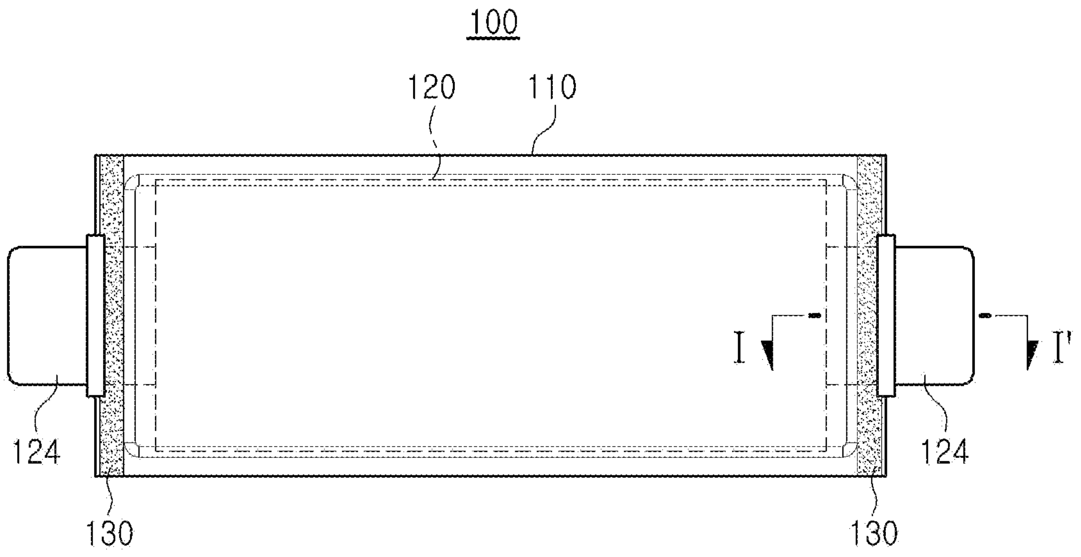
FIG. 1 schematically illustrates a secondary battery according to an embodiment of the disclosed technology.

Features of the disclosed technology disclosed in this patent document are described by example embodiments with reference to the accompanying drawings.

Elements indicated with the same reference numerals in the accompanying drawings to aid understanding of the description of the embodiments are the same elements, and among the components that perform the same action in respective embodiments, related components are indicated by the same or similar reference numerals.

In addition, to clarify the gist of the disclosed technology, descriptions of elements and techniques well known by the related art will be omitted. Hereinafter, the disclosed technology will be described in detail with reference to the accompanying drawings.

However, the spirit of the disclosed technology is not limited to the presented embodiments, and may be suggested in other forms in which specific components are added, changed, or deleted by those skilled in the art, and it should be noted that this is also included within the scope of the same spirit as the disclosed technology.

FIG. 1 schematically illustrates a secondary battery 100 according to an embodiment. As illustrated in FIG. 1, a secondary battery 100 includes a pouch case 110, an electrode assembly 120 is accommodated in the pouch case 110, and the interior of the pouch case 110 may be filled with electrolyte (not illustrated).

In an embodiment, the pouch case 110 is not particularly limited in shape, material, and the like as long as it is generally used in the secondary battery field. For example, the pouch case 110 may be a laminate film formed by sequentially stacking a first resin layer, a metal layer, and a second resin layer. In addition, although not particularly limited, an adhesive layer for bonding the metal layer and the second resin layer may be present between the metal layer and the second resin layer.

The first resin layer provides thermal adhesiveness, and a material capable of being melted by heat to provide adhesiveness may be applied, and for example, the first resin layer may be composed of a polyolefin-based resin such as polypropylene (PP) resin. In addition, the second resin layer may be composed of at least one of a nylon resin and a polyethylene terephthalate (PET) resin. On the other hand, the metal layer may be an aluminum foil.

The pouch case 110 may include a case body portion 111 and a cover portion 112, accommodating the electrode assembly 120 therein. The case body portion 111 and the cover portion 112 may have the same material, the case body portion 111 and the cover portion 112 may be separated from each other, and one pouch may be folded and provided as the case body portion 111 and the cover portion 112.

In a state in which the electrode assembly 120 is accommodated, the first resin layer of the case body portion 111 and the first resin layer of the cover portion 112 are brought into contact with each other and applied with heat and pressure, to be sealed. At this time, when the pouch case 110 is separated into the case body portion 111 and the cover portion 112, four sides may be sealed, and when one pouch is folded and provided as the case body portion 111 and the cover portion 112 of the pouch case 110, three sides may be sealed. Furthermore, if necessary, an envelope-type pouch case 110 may be used, and in this case, two-side sealing or one-side sealing may be performed.

In an embodiment, the electrode assembly 120 is accommodated in the pouch case 110. The electrode assembly 120 includes at least one positive electrode in which a positive electrode mixture layer containing a positive electrode active material is provided on at least one surface of the positive electrode current collector; and at least one negative electrode in which a negative electrode mixture layer including a negative electrode active material is provided on at least one surface of the negative electrode current collector, and a separator may be interposed between the positive electrode and the negative electrode.

For example, the electrode assembly 120 may be a stack type electrode assembly in which a plurality of positive electrodes and negative electrodes are alternately stacked and a separator is interposed between the positive electrode and the negative electrode, may be a stack-and-folding type electrode assembly in which a plurality of positive electrodes and negative electrodes are alternately stacked by folding a rectangular separator, or may be a winding-type electrode assembly in which a rectangular positive electrode, a rectangular negative electrode, or a rectangular separator between the positive electrode and the negative electrode are laminated and wound in one direction, and may be a combination of two or more thereof.

In the electrode assembly 120, electrode tabs 123, which are electrode uncoated portions, drawn out from the electrode current collectors of respective electrodes are collected and connected to the electrode lead 124. The electrode leads 124 of the negative electrode and the positive electrode may be drawn out in one direction of the electrode assembly 120 or in both directions thereof. The electrode lead 124 connected to the electrode tab 123 is formed to extend toward the outside of the pouch case 110, thereby providing a path for electrons to move between the inside and outside of the pouch case 110.

The connection method between the electrode tab 123 and the electrode lead 124 is not particularly limited. For example, the electrode tab 123 may be connected to the electrode lead 124 by welding. A portion of the electrode lead 124 is exposed to the outside of the pouch case 110, and the electrode lead 124 exposed to the outside of the pouch case 110 may be electrically connected to an external terminal.

In an embodiment, in a state in which the electrode lead 124 is drawn out of the pouch case 110, the first resin layers of the case body portion 111 and the cover portion 112 face each other and are thermally fused, thereby forming a sealing portion 130. Although not particularly limited, the sealing portion 130 may be formed along the outer circumference of the pouch case 110, and as described above, the sealing portion 130 may be formed on three or four sides of the pouch. In detail, the sealing portion 130 may be formed on the outer circumferential surface of the pouch case 110 from which the electrode lead 124 is drawn out.

In the case of a secondary battery, when the internal temperature rises during battery operation, the electrolyte evaporates or a gas is generated due to a side reaction between the electrolyte and the electrode. A thermal runaway phenomenon in which the pouch expands due to an increase in internal pressure of the battery may occur. When such a thermal runaway phenomenon occurs in any one battery, heat is propagated to an adjacent battery, causing a chain of thermal runaway and fire.

Accordingly, as an embodiment of the disclosed technology, by forming a vent capable of discharging gas and electrolyte in the pouch case 110 when a thermal runaway phenomenon reaching a specific temperature or higher occurs, thermal runaway may be prevented, thereby maintaining stable battery performance and improving the safety of batteries by preventing explosions and the like.

Figure 2:
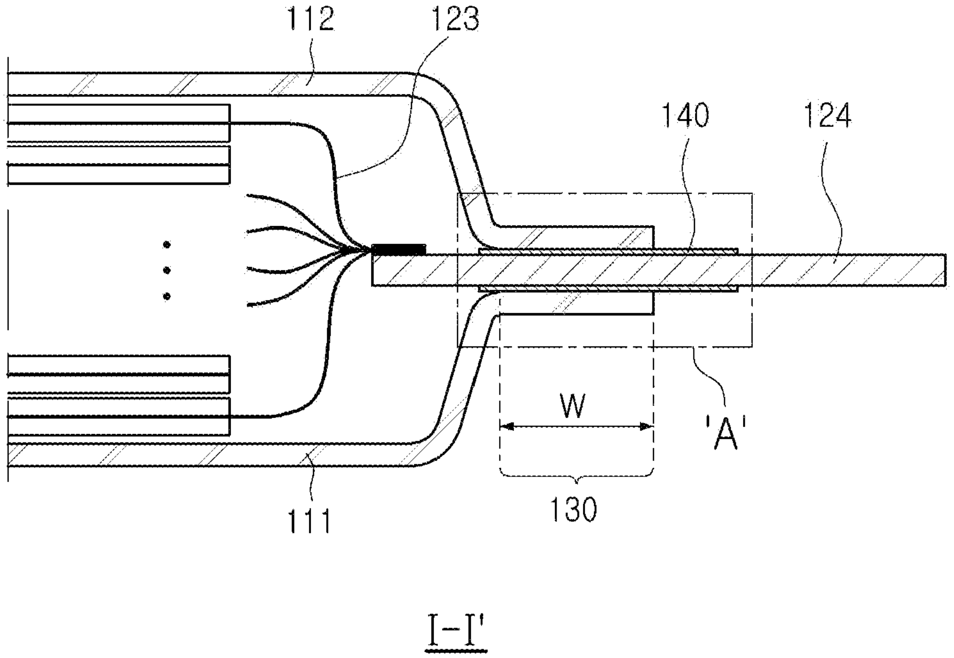
FIG. 2 is a view schematically illustrating a cross section taken along line I-I' of FIG. 1 and illustrates an example including a polymer compound layer on both sides of an electrode lead.

To this end, according to an embodiment of the disclosed technology, as illustrated in FIG. 2, a polymer compound layer 140 including a polymer compound of which the volume is changed by heat may be provided on the surface of the electrode lead 124.

The polymer compound layer 140 formed on the surface of the electrode lead 124 may include a polymer compound of which the volume changes as the internal temperature of the battery increases. In detail, the polymer compound may be a thermally expandable polymer compound or a heat-shrinkable polymer compound.

The temperature at which the volume of the polymer compound layer 140 changes is not particularly limited, but may be 80° C. or higher, for example, 80° C. or higher, 85° C. or higher, 90° C. or higher, or 100° C. or higher. On the other hand, the upper limit of the temperature at which the volume of the polymer compound layer changes is not particularly limited, and may be 130° C. or less, for example, 120° C. or less. When the volume changes due to heat at a temperature of 130° C. or lower, even after heat is generated in the cell, the sealing may be released to discharge the gas and electrolyte inside of the battery, preventing thermal propagation to the adjacent cell due to additional heat diffusion. In addition, when the volume of the polymer compound layer changes at a temperature of 120° C. or less, occurrence of a thermal runaway situation may be prevented in advance.

Examples of the thermally expandable polymer compound included in the polymer compound layer 140 include, but are not limited to, a composite of a hydroxyl group-containing compound and silica. Examples of the composite of the hydroxyl group-containing compound and silica may include a composite of silica and polyurethane.

When the polymer compound layer 140 includes a thermally expandable polymer, the volume of the polymer compound layer 140 at 80° C. or higher may increase by 30 to 4,000 times compared to the volume of the polymer compound layer 140 at room temperature (25° C.).

On the other hand, examples of the heat-shrinkable polymer compound included in the polymer compound layer 140 may include polyphenylene ether (PPE), polycarbonate (PC), polyoxymethylene (POM), and polyamide (PA).

In the case in which the polymer compound layer 140 includes a heat-shrinkable polymer compound, the volume of the polymer compound layer 140 at 80° C. or higher may decrease by 0.02 to 0.9 times compared to the volume of the polymer compound layer 140 at room temperature.

In an embodiment, the polymer compound layer 140 may have a thickness of 3 μm to 25 μm. If the thickness is less than 3 μm, it may be difficult to discharge gas or electrolyte solution due to lack of expansion or contraction of the polymer compound layer 140, and as a result, performance and safety of the cell may be weakened. On the other hand, if the thickness of the polymer compound layer 140 exceeds 25 μm, the adhesiveness of the polymer compound layer 140 is weakened, and may not be properly adhered to the pouch case 110, the electrode assembly 120, or the sealing portion 130, and the performance and safety of the cell may be weakened.

In an embodiment of the disclosed technology, the form of the polymer compound is not particularly limited, and for example, the polymer compound may be in the form of beads, pillars, flakes, or powder. Depending on the type of polymer compound and the location where the polymer compound layer 140 is formed, an appropriate type of polymer compound may be selected and used.

In addition, a polymer compound in which expanded graphite is filled inside of the polymer compound may be used. In this case, expanded graphite means graphite having volume expansion at a certain temperature or higher, and the degree of volume expansion is not particularly limited, and the volume may expand one hundred times or more compared to the volume before expansion. The components or manufacturing method of expanded graphite are not particularly limited.

The polymer compound layer 140 may be formed on one side or both sides of the electrode lead 124. Even if the polymer compound layer 140 is formed only on one surface of the electrode lead 124, a vent may be induced due to the volume expansion of the polymer compound layer 140 according to the temperature change inside of the battery, and therefore, the disclosed technology is not particularly limited.

FIG. 2 is a view illustrating a cross section taken along line I-I' of FIG. 1. As illustrated in FIG. 2, the polymer compound layer 140 of which the volume changes is the surface of the electrode lead 124, and may be formed in an area where the sealing portion 130 of the pouch case 110 is formed.

The polymer compound layer 140 may be formed in the entirety of the sealing portion 130 of the pouch case 110 in the width (W) direction, for example, in the I-I' direction in FIG. 1, and may also be formed in a partial area of the sealing portion 130 in the width (W) direction. For example, even in the case in which the polymer compound layer 140 is formed in a portion of the width W of the sealing portion 130, the sealing strength of the sealing portion 130 may be weakened because the polymer compound layer 140 shrinks and expands due to heat, and the gas generated inside of the secondary battery is concentrated in the area where the sealing strength is weakened, and the sealing of the remaining sealing portion 130 may be released by the pressure of the gas, and thus, the discharge of the gas and the electrolyte may be induced.

In detail, as illustrated in FIG. 2, the polymer compound layer 140 is formed on both sides of the electrode lead 124 connected to the electrode tab 123 and protruding out of the pouch case 110, and the case body portion 111 and the cover portion 112 of the pouch case 110 are respectively positioned on the polymer compound layer 140 and sealed, thereby forming the sealing portion 130. In more detail, as illustrated in FIG. 2, the polymer compound layer 140 may be formed on at least a portion of the sealing portion 130 having the width (W) that represents the length from the starting point of the sealing portion 130, which is the point at which the sealing of the pouch case 110 starts inside of the pouch case 110, to the end of the pouch case 110.

As such, the polymer compound layer 140 is disposed between the electrode lead 124 and the pouch case 110, in the region where the sealing portion 130 on the electrode lead 124 is formed. As the temperature inside of the battery increases, the polymer compound layer 140 expands or contracts, which may weaken the sealing strength of the sealing portion 130. Pressure is concentrated in a region of the sealing portion 130 where sealing strength is weakened to form a vent, and thus gas or electrolyte may be discharged through the formed vent.

As long as at least a portion of the polymer compound layer 140 is positioned within the sealing portion 130 where the pouch case 110 on the electrode lead 124 is sealed, the shape or detailed location thereof is not particularly limited. Since at least a portion of the polymer compound layer 140 is present in the sealing portion 130, the volume is changed by heat generated inside of the battery, thereby reducing the sealing strength of the sealing portion 130.

For example, the polymer compound layer 140 may be formed as illustrated in FIGS. 3 to 6 in which area 'A' in FIG. 2 is enlarged.

Figure 3:
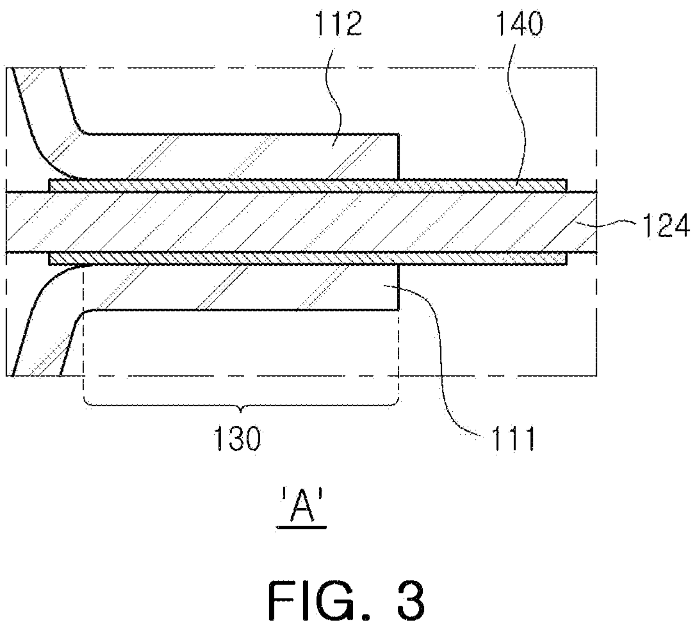
FIG. 3 illustrates an example of region 'A' of FIG. 2, in which one end of the polymer compound layer is located inside of the pouch case and the other end thereof is located outside the sealing portion.
Figure 4:
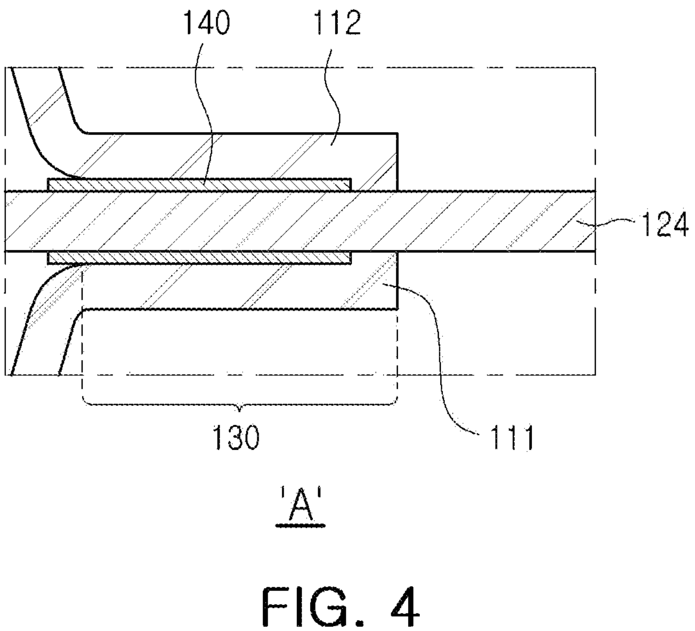
FIG. 4 illustrates another example of region 'A' of FIG. 2, in which one end of the polymer compound layer is located inside of the pouch case and the other end thereof is located inside of the sealing portion.

In detail, as illustrated in FIG. 3, one end of the polymer compound layer 140 is located inside of the pouch case 110, and the other end thereof may be formed to be located outside of the pouch case 110. As another example, as illustrated in FIG. 4, one end of the polymer compound layer 140 is present inside of the pouch case 110, and the other end thereof may be formed to be located outside of the pouch sealing portion 130.

As such, as one end of the polymer compound layer 140 is located inside of the pouch case 110, in the case in which a thermal runaway situation occurs inside of the battery, the sealing strength of the sealing portion 130 of the pouch is reduced by contraction or expansion of the polymer compound layer 140, and venting of the gas may be induced by concentrating the pressure by the gas generated inside of the battery on the area where the sealing strength is reduced.

Figure 5:
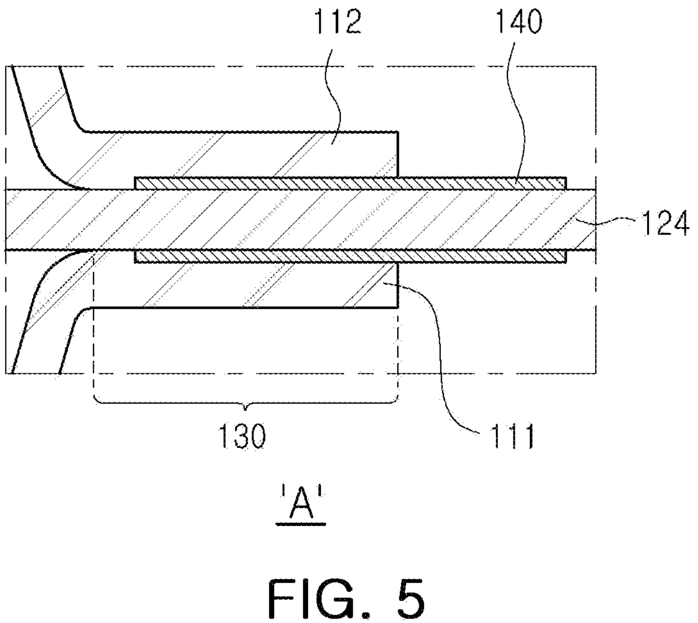
FIG. 5 illustrates another example of region 'A' of FIG. 2, in which one end of the polymer compound layer is located inside of the sealing portion and the other end thereof is located outside the sealing portion.
Figure 6:
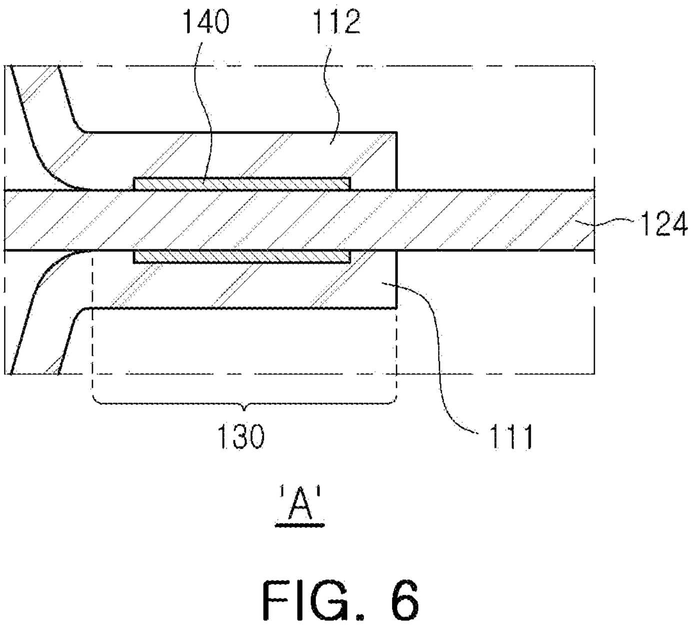
FIG. 6 illustrates another example of region 'A' of FIG. 2, in which one end and the other end of the polymer compound layer are located inside of the pouch case.

As another example, as illustrated in FIG. 5, the polymer compound layer 140 has one end located inside of the sealing portion 130, and the other end thereof may be formed to be located outside the sealing portion 130. As another example, as illustrated in FIG. 6, both ends of the polymer compound layer 140 may be formed to be located inside of the sealing portion 130 of the pouch case 110.

As such, one end of the polymer compound layer 140 is located inside of the pouch case 110 in the region where the sealing portion 130 is formed. As a result, when a battery thermal runaway situation occurs, the sealing strength of the sealing portion 130 is reduced by contraction or expansion of the polymer compound layer 140. Therefore, venting may be induced by concentrating the pressure by the gas generated inside of the battery to the area where the sealing strength is lowered.

Figure 7:
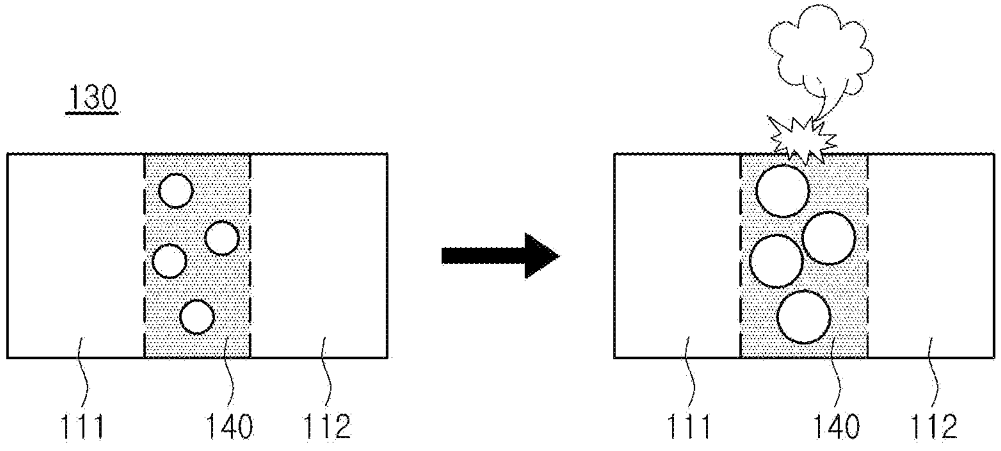
FIG. 7 is a view schematically illustrating the concept of forming a gas discharge passage when a polymer compound layer including a thermally expandable polymer compound is formed on the surface of an electrode lead.

FIG. 7 is a diagram schematically illustrating the concept of forming a passage through which gas may be discharged when the polymer compound layer 140 including a thermally expandable polymer compound is formed on a portion of the sealing portion 130. As illustrated in FIG. 7, when the polymer compound layer 140 including the thermally expandable polymer compound in a portion of the sealing portion 130 reaches the expansion temperature of the thermally expandable polymer in the battery, the polymer compound layer 140 expands due to heat, and thus, the sealing strength of the sealing portion 130 may be reduced.

As a result, the gas generated inside of the battery is concentrated in the area where the sealing strength is weakened, and the sealing is released by applying pressure, thereby forming a passage for gas discharge. Accordingly, discharging gas and electrolyte inside of the battery through the passage may be induced to suppress additional temperature rise and battery explosion.

Figure 8:
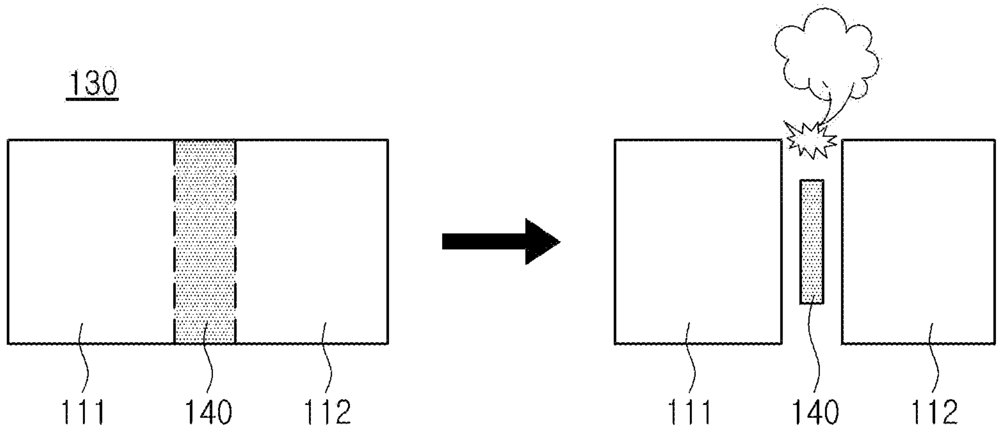
FIG. 8 is a diagram schematically illustrating the concept of forming a gas discharge passage when a polymer compound layer including a heat-shrinkable polymer compound is formed on the surface of an electrode lead.

On the other hand, FIG. 8 is a diagram schematically illustrating the concept of forming a passage through which gas may be discharged when the polymer compound layer 140 including a heat-shrinkable polymer compound is formed on a portion of the sealing portion 130. As illustrated in FIG. 8, when the polymer compound layer 140 including the heat-shrinkable polymer compound in a portion of the sealing portion 130 reaches the contraction temperature of the heat-shrinkable polymer in the battery, the polymer compound layer 140 shrinks due to heat, thereby weakening sealing strength of the sealing portion 130 and forming a passage for gas discharge.

Furthermore, although not illustrated in the drawings, the polymer compound layer 140 may have a width equal to or different from the width of the electrode lead 124. In detail, the width of the polymer compound layer 140 may be the same as the width of the electrode lead 124, and may also be narrower or wider than the width of the electrode lead 124.

The polymer compound layer 140 may be formed anywhere on the negative electrode lead and the positive electrode lead, and in more detail, may be formed on the positive electrode lead. In the case in which heat is generated in the battery, a side reaction between the positive electrode active material and the electrolyte becomes more active due to the temperature rise, and more heat is generated on the positive electrode. This heat may be more significant in the vicinity of the positive electrode lead. Therefore, when the polymer compound layer 140 is formed on the positive electrode lead, the vent may be more easily formed by inducing volume expansion or contraction of the polymer compound layer according to an increase in temperature inside of the battery.

Figure 9:
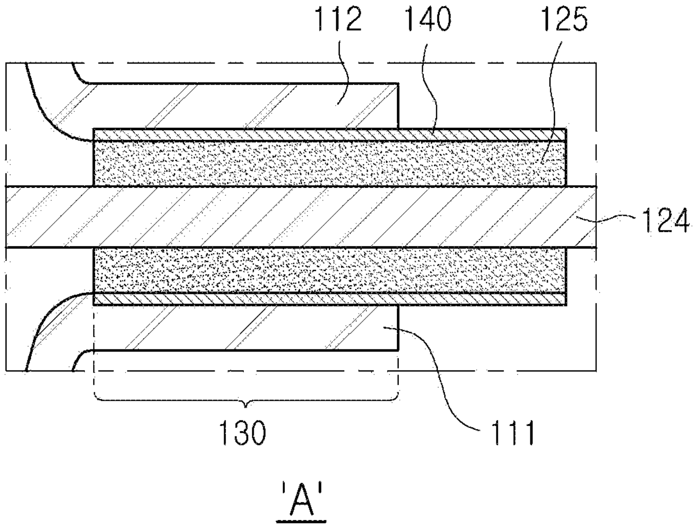
FIG. 9 is a view illustrating an example of further including sealant layers on both sides of an electrode lead as another embodiment of FIG. 2.

As an example embodiment, the sealant layer 125 may be provided on the surface where the electrode lead 124 is present, for example, on at least one surface of the electrode lead 124 as illustrated in FIG. 9, in more detail, on both sides of the electrode lead 124. The sealant layer 125 may improve adhesion between the first resin layer of the pouch case 110 and the electrode lead 124, and in addition, may improve adhesion between the polymer compound layer 140 and the electrode lead 124. Since the adhesiveness between the electrode lead 124 and the polymer compound layer 140 may be further improved by the sealant layer 125, unintended generation of vents may be suppressed in the normal state.

For the sealant layer 125, a commonly used material may be applied in the disclosed technology, and examples thereof may include polypropylene (PP), polyphthalamide (PPA), and the like.

The sealant layer 125 is not particularly limited, but may have a thickness of 100 μm to 200 μm. If the thickness of the sealant layer 125 is less than 100 μm, there are problems such as a decrease in corrosion resistance, insulation resistance, and adhesiveness, and if the thickness of the sealant layer 125 exceeds 200 μm, costs may increase, and in the battery production process, there is a concern that the reliability of sealing may be lowered because the pouch is not completely sealed.

The sealant layer 125 is not particularly limited, but may have a length greater than the width W of the sealing portion 130 formed on the electrode lead 124, and in addition, may have the same length as the width (W) of the sealing portion 130.

According to each embodiment provided in the disclosed technology, by forming a polymer compound layer containing a polymer compound that expands or contracts by heat on the surface of the electrode lead, heat generated inside of the battery may cause contraction and expansion of the polymer compound layer. The sealing strength of the sealing portion formed on the electrode lead may be reduced by the contraction and expansion of the polymer compound layer. A passage for discharge may be formed by releasing the sealing by inducing the gas generated inside of the battery to be concentrated in the area where the sealing strength is weakened. Therefore, gas or electrolyte may be discharged through the formed passage, and additional temperature rise may be suppressed and the safety of the battery may be secured.

As set forth above, according to an embodiment, a secondary battery including a polymer compound layer of which the volume changes at a specific temperature or higher is provided, and by suppressing thermal explosion at the cell-level, thermal propagation to the remaining cells in the pack and module may be prevented, thereby stably maintaining performance of the secondary battery and ensuring the safety of the battery.

Only specific examples of implementations of certain embodiments are described. Variations, improvements and enhancements of the disclosed embodiments and other embodiments may be made based on the disclosure of this patent document.

What is claimed is:

1. A secondary battery comprising:

an electrode assembly to which an electrode lead is bonded;

a pouch case including a case body portion and a cover portion covering the case body portion to form a cavity accommodating the electrode assembly in such a manner that a portion of the electrode lead protrudes externally of the pouch case; and a sealing portion in which outer circumferential portions of the case body portion and the cover portion of the pouch case contact each other and are sealed by thermal fusion, the sealing portion is positioned between the cavity and an exterior of the pouch case in the outer circumferential portions, wherein a polymer compound layer is attached on at least one of an upper surface and a lower surface of the electrode lead, the polymer compound layer includes a thermally expandable polymer compound of a composite of a hydroxy group-containing compound and silica; or at least one heat-shrinkable polymer compound selected from the group consisting of polyphenylene ether (PPE), polycarbonate (PC), polyoxymethylene (POM) and polyamide (PA), the polymer compound layer has a first end located inside of the cavity, and a second end located inside or outside of the sealing portion, and the polymer compound layer is configured to expand or contract in response to increased temperature and break the sealing portion to form a passage for gas discharge from the cavity.

2. The secondary battery of claim 1, wherein the composite of the hydroxy group-containing compound and the silica is a composite of polyurethane and silica.

3. The secondary battery of claim 1, wherein the polymer compound layer is formed on a portion or an entirety of a width of the sealing portion on the electrode lead.

4. The secondary battery of claim 1, wherein the polymer compound layer has a thickness of 3 to 25 μm.

5. The secondary battery of claim 1, wherein the polymer compound layer includes the thermally expandable polymer compound and has a volume at a temperature of 80° C. or higher, which is 30 to 4,000 times a volume at room temperature.

6. The secondary battery of claim 1, wherein the polymer compound layer includes the heat-shrinkable polymer compound and has a volume at 80° C. or higher, which is 0.02 to 0.9 times a volume at room temperature.

7. The secondary battery of claim 1, wherein the thermally expandable polymer compound or the heat-shrinkable polymer compound is in a form of beads, pillars, flakes, or powder.

8. The secondary battery of claim 1, wherein the polymer compound layer includes the thermally expandable polymer compound and the polymer compound layer further comprises expanded graphite filled inside of the thermally expandable polymer compound.

9. The secondary battery of claim 1, further comprising a sealant layer on at least one of the upper surface and the lower surface of the electrode lead.

* * * * *